DIGITAL SPEECH TRANSFER SYSTEM INCLUDING FOR EXAMPLE A SYNCHRONIZING ARRANGEMENT FOR TIME DIVISION MULTIPLEX SIGNALLING SYSTEM OF SAME NOMINAL FREQUENCY

Filed June 22, 1962 5 Sheets-Sheet 1

Peter Heaton

*Inventor*

By Cushman, Darby & Cushman

*Attorneys*

Aug. 30, 1966 P. HEATON 3,270,136

DIGITAL SPEECH TRANSFER SYSTEM INCLUDING FOR EXAMPLE A SYNCHRONIZING ARRANGEMENT FOR TIME DIVISION MULTIPLEX SIGNALLING SYSTEM OF SAME NOMINAL FREQUENCY

Filed June 22, 1962 3 Sheets-Sheet 2

PETER HEATON
*Inventor*

By Cushman, Darby & Cushman
*Attorneys*

Aug. 30, 1966 P. HEATON 3,270,136

DIGITAL SPEECH TRANSFER SYSTEM INCLUDING FOR EXAMPLE A SYNCHRONIZING ARRANGEMENT FOR TIME DIVISION MULTIPLEX SIGNALLING SYSTEM OF SAME NOMINAL FREQUENCY

Filed June 22, 1962 3 Sheets-Sheet 3

PETER HEATON
*Inventor*

By Cushman, Darby & Cushman
*Attorneys*

United States Patent Office 3,270,136
Patented August 30, 1966

3,270,136

DIGITAL SPEECH TRANSFER SYSTEM INCLUDING FOR EXAMPLE A SYNCHRONIZING ARRANGEMENT FOR TIME DIVISION MULTIPLEX SIGNALLING SYSTEM OF SAME NOMINAL FREQUENCY

Peter Heaton, Highcliffe, Christchurch, England, assignor to National Research Development Corporation, London, England Filed June 22, 1962, Ser. No. 204,476
Claims priority, application Great Britain, June 28, 1961, 23,381/61
17 Claims. (Cl. 179—15)

The present invention relates to digital speech transfer systems.

When speech is to be transmitted from one station to another, either by radio means or by land line, it may be transmitted in digital form. In one known form of digital speech transmission, the speech waveform is sampled at closely spaced regular intervals and the magnitude of each sample is converted at a transmitting station into a binary code from which the speech is reconstituted at a receiving station. Such a system is known as a "pulse code modulation system." In another known system, the difference in the magnitudes of successive samples are transmitted digitally by means of pulses. Such a system is known as a "delta modulation system." A number of digital speech channels may be transmitted in either of these modulation systems in time division multiplex.

It has been proposed that a network of stations should be set up covering a considerable ground area in a similar pattern to trunk telephone exchanges. In this manner, speech messages could be transmitted from one point to another along any of a number of routes through different intermediary stations in the network. When a pulse code modulation system is used, or alternatively when a delta modulation system is used, it is necessary to maintain the speech message in digital form throughout its transmission route to avoid the degradation of speech quality which would result from decoding and re-coding the speech at each intermediary station. Also, ideally, reception at an intermediary station from one link and re-transmission over the next link from the intermediary station should be in synchronism. Unfortunately this would involve the stations throughout the whole network being in synchronism. This is not easy to achieve in practice.

An alternative solution is to control the timing of each transmitter at an intermediary station separately at as nearly as possible the same timing as that of all the other transmitters at the other stations. This involves a non-synchronous transfer of the digital information from the receiver to the transmitter at each station in the network. It has been proposed to do this by setting up the received digital information in a receiver store at intervals controlled by the timing of the received signals and to transfer to a transmitter and re-transmit the content of the store at intervals controlled by the station transmitter. In such a system, it is inevitable that instants will arise at which attempts will be made to transfer the content of the store while the store is being set up, because the transmitter and the received information are, at least for a short time, in exact isochronism. This will probably result in at least one, and probably many more, incorrect samples being re-transmitted in immediate succession. Particularly in the case of pulse code modulation in which, say, about five digits may be held in the store during a transfer, this may result in the subsequently reconstituted speech being rendered unintelligible.

It is an object of the present invention to provide a digital speech transfer system for transferring digital speech signals from a receiver to a transmitter at a communications station, in which the aforementioned difficulty of attempted transfer from a receiver store to the transmitter whilst the receiver store is being set up with incoming digital information is largely overcome.

According to the present invention there is provided a digital speech transfer system including a store, transmitting means, means for interrogating the store by interrogation signals related in time to the timing of the transmitting means and control means for controlling the relative timing of the interrogation signals and times of receipt of incoming digital signals into the store so that the interrogation signals do not occur during the times of receipt of the incoming digital signals into the store. The control means may include means for generating a guard signal embracing in time the time of receipt of the incoming digital signal or signals into the store and means for adjusting the relative timing of the interrogation signals and the times of receipt of incoming digital signals into the store whenever an interrogation signal occurs during a guard signal.

According to a feature of the present invention, there is provided a digital speech transfer system including a receiver store arranged to be set up at regular intervals in accordance with at least one received digital signal, a transmitter store, means for generating from a received signal a guard pulse which embraces the time at which the receiver store is set up, means for generating a first train of transfer pulses which recur at regular intervals having approximately the same length as the intervals between the settings up of the receiver store, means for generating a second train of transfer pulses occurring intermediately between the pulses of the first train of transfer pulses and switching means arranged to select one or the other of the trains of transfer pulses to effect transfer of digit signals from the receiver store to the transmitter store such that an alternative one of the trains of transfer pulses is so selected when a pulse of the other train lies within a guard pulse.

An embodiment of the present invention will now be described, by way of example, with reference to the accompanying drawings, in which.

Figure 1:
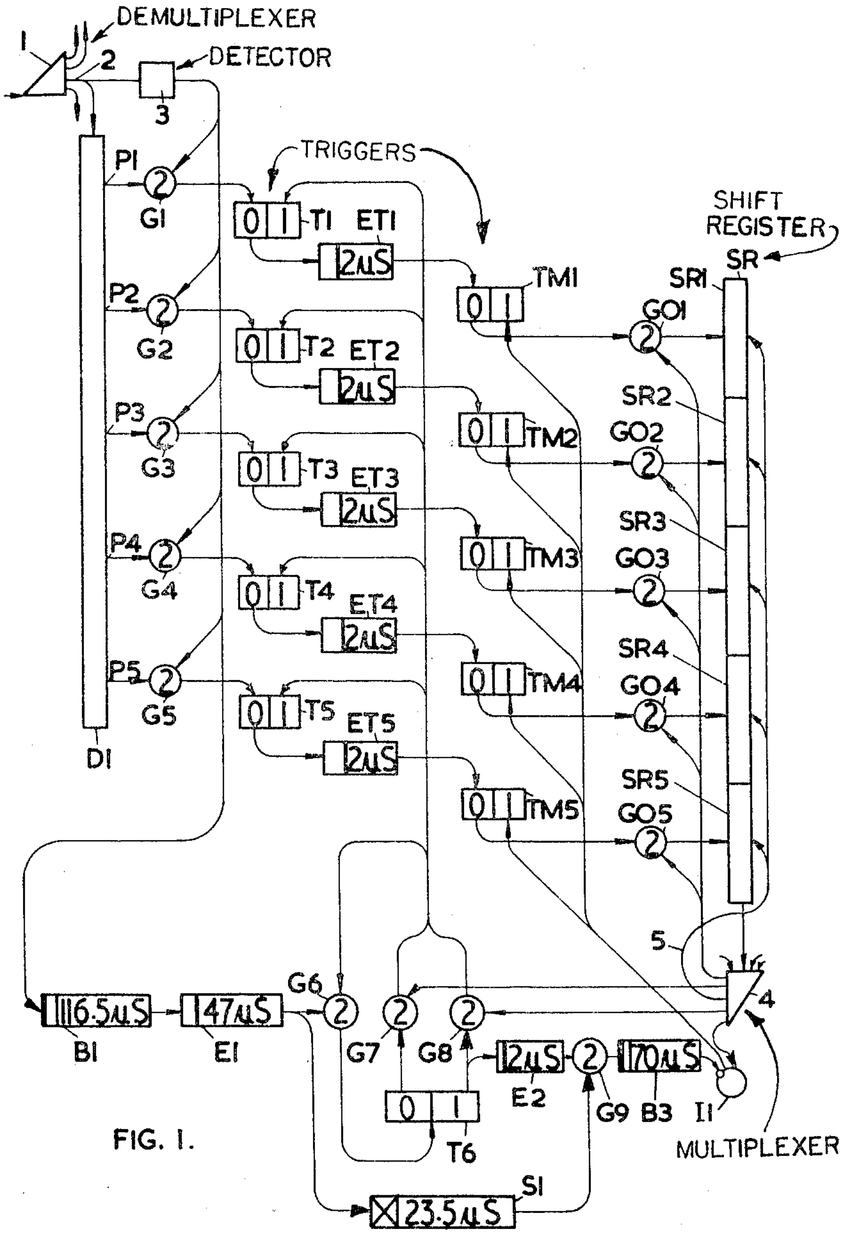
FIGURE 1 is a circuit diagram of a digital speech transfer system.

FIGURE 1 shows a demultiplexer 1. For simplicity this demultiplexer will be described as receiving signals representing four speech channels. Each of these speech channels consists of speech represented by pulse code modulation. Each quantum sample of the pulse code modulation is represented by five binary digits which are received serially and are followed by a synchronizing signal. Each of the digits is received as a signal in one of two possible states representing a binary 1 or a binary 0 and the synchronizing signal is a distinctive signal which may, for example, be of different length or of different sign from the binary signals. The five digit signals and the synchronizing signal of a channel follow immediately upon one another and then are followed in time-divisional multiplex with the signals of the other channel. The methods of multiplexing and demultiplexing are not important to this invention and any known methods may be employed.

The demultiplexer 1 has, in this embodiment, four output channels, each of which bears a sequence of signal groups each comprising a succession of digit signals and a synchronising signal corresponding to that channel. The circuits for processing each channel are identical and only one is shown in FIGURE 1. This channel is shown emerging from the demultiplexer 1 on a line 2 and is applied to a reflectionless delay line D1 and to a synchronising pulse detector 3.

For the purpose of explanation of this embodiment of the invention, the form of the digit signals will be assumed to be a pulse to represent the binary digit 1 and the absence of a pulse to represent the binary digit 0. The synchronising signal is also a pulse, this pulse having a distinctive width or sign. The digit signals from the demultiplexer 1 on the line 2 travel in succession down the delay line D1. The detector 3 detects the synchronising pulse by means of its distinctive width or sign and emits a short output pulse upon the receipt of the synchronising pulse. The timing of the synchronising pulse is such that upon the emission of the output pulse from the detector 3, the five digit signals are present at five tapping points P1 to P5 respectively of the delay line D1. The tapping points P1 to P5 are connected to the inputs of five triggers T1 to T5, which constitute the input or receiver store, through five AND gates G1 to G5 respectively. The output from the detector 3 is applied to the gates G1 to G5 so that when an output pulse occurs from the detector 3 the digital content of the delay line D1 is transferred to the triggers T1 to T5 which are arranged initially to be off (that is to say with a 0 signal in the output line from the 0 box). That is to say that, when an output pulse occurs at the output of the detector 3, a particular trigger of the triggers T1 to T5 will be put on (so as to have a 1 signal in the output line from the 0 box) if a pulse is present at its associated tapping point on the delay line D1 or will remain off (with a 0 output signal) if no pulse is present at this tapping point.

The output pulse from the detector 3 is also applied to a beginning element B1 the output of which is applied to an end element E1. The output of the end element E1 is applied to an AND gate G6 the output of which is applied to a changeover input of a trigger T6. The output and the negated output of the trigger T6 are applied to two AND gates G7 and G8 respectively, the combined otuputs of which are applied to the inhibiting inputs of the triggers T1 to T5. That is to say, whenever a pulse is allowed through either of the gates G7 and G8, the triggers T1 to T5 are put off so that they have 0 output signals. The combined outputs of the gates G7 and G8 are also applied to a second input of the gate G6. The outputs of the triggers T1 to T5 are connected through end elements ET1 to ET5 to the inputs of five transmitter store triggers TM1 to TM5 respectively. When any of the triggers T1 to T5 is put off by a pulse from either of the gates G7 and G8, the corresponding end element generates a two-microseconds pulse to put the corresponding trigger TM1 to TM5 on. By this means the contents of the triggers T1 to T5 are transferred to the triggers TM1 to TM5 whenever a pulse passes through one of the gates G7 and G8.

The outputs of the triggers TM1 to TM5 are connected through AND gates GO1 to GO5 to stages SR1 to SR5 respectively of a shift register SR. The output of the last stage of the shift register SR is connected to one of the inputs of a multiplexer 4. At an appropriate time in the multiplexer cycle, the multiplexer 4 applies a pulse to the gates GO1 to GO5 and this pulse is applied, or is not applied, to the corresponding stages of the shift register SR according to whether the corresponding one of the triggers TM1 to TM5 is respectively on or off. Immediately after the multiplexer 4 applies a pulse to the gates GO1 to GO5 it also applies five pulses via a line 5 to the register stages SR1 to SR5 so that the content of the shift register SR is applied serially to the input of the multiplexer 4. In this way, the digit signals stored in the triggers TM1 to TM5 are applied to the input of the multiplexer 4 in the required time sequence. In the multiplexer 4, a synchronising pulse is caused to follow the digit signals and these signals appear at the output of the multiplexer 4 in time-division multiplex with similar signals from the other channels.

The multiplexer 4 also emits two interleaved pulse trains MX1 and MX2 which are applied to the gates G7 and G8 respectively so that the pulse train MX1 is applied to the inhibiting inputs of the triggers T1 to T5 if the trigger T6 is on and the pulse train MX2 is applied to the inhibiting inputs of the triggers T1 to T5 if the trigger T6 is off.

The output of the end element E1 is applied to a slow-to-operate element S1. The output of the element S1 is applied to an AND gate G9. The other input to the gate G9 is derived from the negated output of the trigger T6 through an end element E2. The output of the gate G9 is applied to a beginning element B3 the output of which is applied to the inhibiting input of an inhibiting gate I1. A train of pulses MXSO is applied to the gate I1 from the multiplexer 4 and the output of the gate I1 is applied to the inhibiting inputs of the triggers TM1 to TM5 to put them off.

Figures 2, 3:
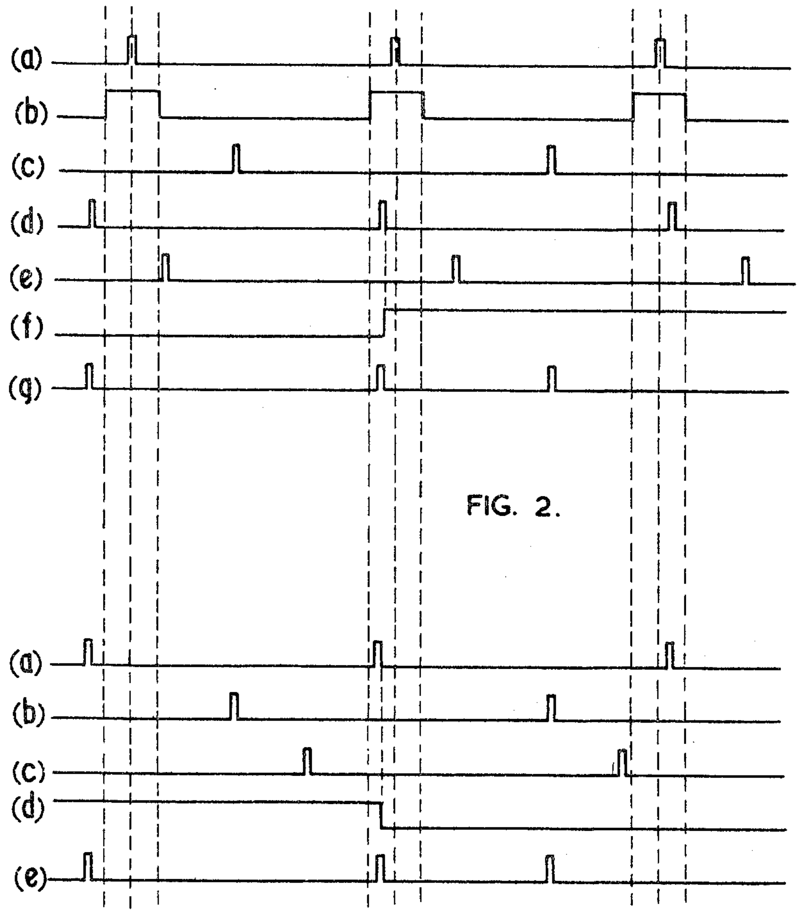
FIGURES 2 to 5 are graphical diagrams illustrating the waveforms occurring in various parts of the circuit shown in FIGURE 1 under various different conditions of operation.

The operation of the system will now be described with reference to FIGURES 2 to 5 which show the relative pulse timings in various parts of the system for various different operating conditions. For example, FIGURE 2 shows the pulse timings for the case in which the multiplexer 4 is operating at a slightly slower speed than the signals derived from the demultiplexer 1. For the purposes of explanation it will be assumed that in all cases (FIGURES 2 to 5), the synchronising pulse will occur once every 140 microseconds and the pulse at the output of the detector 3 will occur once every 140 microseconds. The pulses at the output of the detector 3 are shown in FIGURE 2(*a*) and FIGURE 4(*a*). When these pulses occur, the digit signals are extracted from the delay line D1 and transferred to the triggers T1 to T5. The pulses at the output of the detector 3 are applied to the beginning element B1 which produces pulses each starting at the beginning of a pulse shown in FIGURE 2(*a*) and FIGURE 4(*a*) and ending 116.5 microseconds later. From these pulses the end element E1 produces pulses each of which starts at the end of such a pulse and lasts for 47 microseconds. It follows that once the train of pulses illustrated in FIGURES 2(*a*) and 4(*a*) has been started, each of the pulses at the output of the end element E1 starts 23.5 microseconds before a pulse shown in FIGURES 2(*a*) and 4(*a*) and ends 23.5 microseconds after such a pulse. A train of pulses issuing from the end element E1 is shown at FIGURES 2(*b*) and 4(*b*).

FIGURE 2(*c*) shows the MX1 pulses from the multiplexer 4 which, in this case, occur at intervals of slightly greater than 140 microseconds. FIGURE 2(*d*) shows the MX2 pulses from the multiplexer 4 which occur exactly half-way between the MX1 pulses. FIGURE 2(*e*) shows the MXSO pulses which occur half-way between each MX2 pulse and the following MX1 pulse. FIGURE 2(*f*) shows the state of the trigger T6 and FIGURE 2(*g*) shows the pulses applied to the inhibiting inputs of the trigger T1 to T5 through one or the other of the gates G7 and G8. It will be seen from these drawings that the trigger T6 is initially off (FIGURE 2(*f*)) and at the first occurrence of the MX2 pulse, this will pass through the gate G8, as shown in FIGURE 2(*g*), to transfer the contents of triggers T1 to T5 to the triggers TM1 to TM5 respectively, the triggers T1 to T5 being put off ready for the receipt of further digit pulses from the delay line D1. At the next occurrence of an MX2 pulse, this pulse approaches an undesirable timing at which an MX2 pulse from the gate G8 may try to put off the triggers T1 to T5 whilst the incoming digital signals from the delay line D1 are trying to put some of these triggers on at the beginning of the pulse output from the detector 3 (FIGURE 2(*a*)). Once again the MX2 pulse passes through the gate G8, as shown in FIGURE 2(*g*), to effect a transfer but it will now also pass through the gate G6 which is open by the pulse (FIGURE 2(*b*)) at the output of the end element E1. The MX2 pulse will, therefore, be applied to the trigger T6 to change its state as shown in FIGURE 2(*f*). The gate G7 will, therefore, become open and the gate G8 become closed. The next pulse to effect a transfer between the triggers T1 to T5 and the triggers TM1 to TM5 will, therefore, be an MX1 pulse as shown in FIGURE 2(*g*). The MXSO pulses (FIGURE 2(*e*)) from the multiplexer 4 are applied to put off the triggers TM1 to TM5 through the gate I1 (which is open) after each MX2 pulse and no information is lost. Just before each MXSO pulse, a pulse is applied from the multiplexer 4 to the gates GO1 to GO4 to transfer the digit signals stored in the triggers TM1 to TM5 to the shift register SR. The content of the shift register SR is then transferred to the multiplexer 4 as already described.

FIGURE 3 also shows the pulse sequences as they occur when the multiplexer 4 is slightly slower than the signals derived from the demultiplexer 1. However, in this case the trigger T6 is initially on so that the MX1 pulses are effecting transfer between the triggers T1 to T5 and the triggers TM1 to TM5. The pulses shown at FIGURES 2(*a*) and 2(*b*) are not repeated in FIGURES 3 and 5, but relative timings are maintained substantially the same. In FIGURE 3, the waveforms (*a*), (*b*), (*c*), (*d*) and (*e*) are those of the MX1, MX2 and MXSO pulses, the state of the trigger T6 and the pulses passed through either of the gates G7 and G8 respectively. It will be seen that since the trigger T6 is initially on, the first MX1 pulse passes through the gate G7, as shown in FIGURE 3(*e*), to effect a transfer. The second MX1 pulse is approaching the leading edge of the output pulse (FIGURE 2(*a*)) from the detector 3 and falls within the output pulse from the end element E1. This MX1 pulse will, therefore, not only effect a transfer from the triggers T1 to T5 to the triggers TM1 to TM5 but will also pass through the gate G6 to change the state of the trigger T6 as shown in FIGURE 3(*d*). It follows that the gate G7 will become closed and the gate G8 will become open. The next pulse to effect a transfer will, therefore, be an MX2 pulse passing through the gate G8 (FIGURE 3(*e*)). In this case, because the gates GO1 to GO5 are opened only just before an MXSO pulse and because an MXSO pulse occurs to put the triggers TM1 to TM5 off only after an MX2 pulse the digital information corresponding to the first pulse of FIGURE 2(*a*) will be lost. That is to say, two sets of digital information will be transferred from the triggers T1 to T5 to the triggers TM1 to TM5 (by the MX1 passing through the gate G7 and the immediately following MX2 pulse passing through the gate G8) but only the latter set (transferred by the MX2 pulse) will be transferred to the shift register SR. However, this omission of one quantum of information from the transferred information will not seriously distort the transmitted speech.

Figures 4, 5:
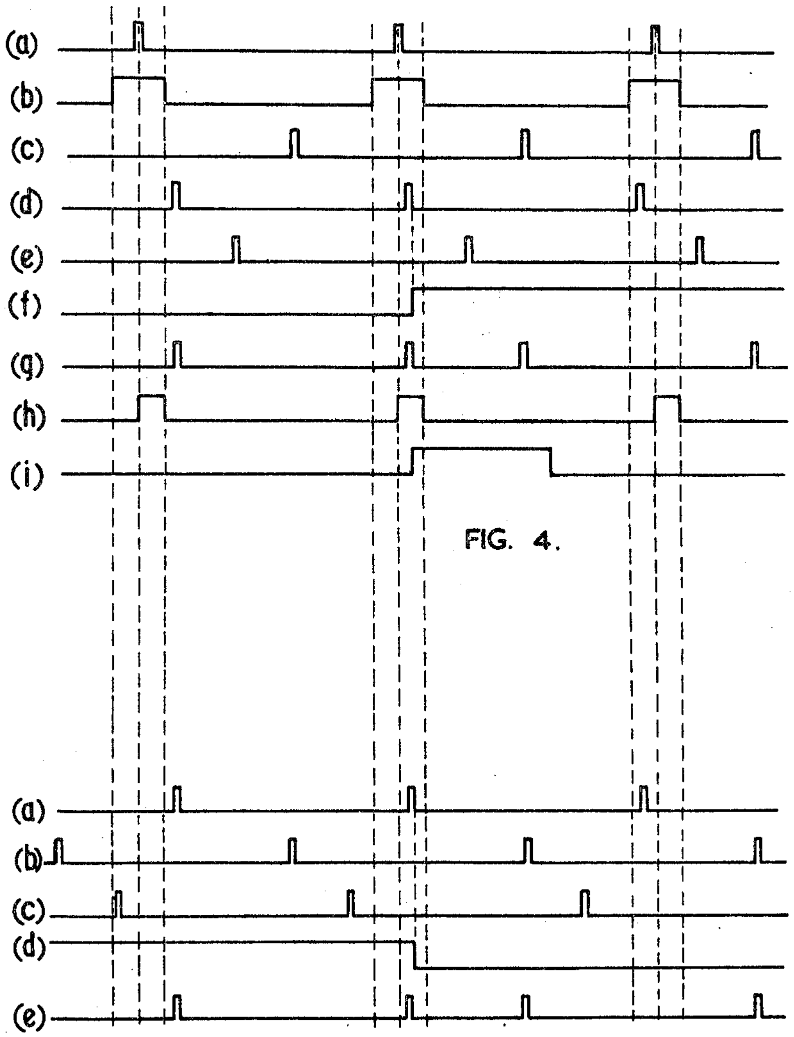

FIGURE 4 illustrates a case in which the multiplexer 4 is slightly faster than the signals derived from the demultiplexer 1. In this case, the MX1 pulses and the MX2 pulses are each slightly less than 140 microseconds apart. In FIGURE 4, the waveforms (*a*), (*b*), (*c*), (*d*), (*e*), (*f*), (*g*), (*h*) and (*i*), represent the output of the detector 3, the output of the end element E1, the MX1, MX2 and MXSO pulses, the state of the trigger T6, the pulses applied to the inhibiting inputs of the triggers T1 to T5 through either one of the gates G7 or G8, the output of the slow-to-operate element S1 and the output of the beginning element B3 respectively. In this case, the trigger T6 is initially off and MX2 pulses are, therefore, allowed past the gate G8 and thence to the inhibiting inputs of the triggers T1 to T5. The first MX2 pulse shown merely passes through the gate G8 in the normal manner to effect a transfer. The second MX2 pulse shown also effects a transfer, but since its timing is appoaching that of the output pulse (FIGURE 4(*a*)) from the detector 3, it falls within the pulse (FIGURE 4(*b*)) at the output of the end element E1. Therefore, the MX2 pulse passes through the gate G6 and changes the state of the trigger T6 as shown in FIGURE 4(*f*). The gate G8 becomes closed and the gate G7 becomes open. The next pulse to be applied to the inhibiting inputs of the triggers T1 to T5 will, therefore, be an MX1 pulse as indicated in FIGURE 4(*g*). However, the last MX2 pulse passing through the gate G8 not only transfers the contents of the triggers T1 to T5 to the triggers TM1 to TM5 but also causes all of the triggers T1 to T5 which are not already off to be put off. When the next MX1 pulse passes through the gate G7 the triggers T1 to T5 will still be off because no fresh digits will have been transferred to them by an output from the detector 3 (see FIGURE 4(*a*)) and the triggers TM1 to TM5 would normally have been put off by the intervening MXSO pulse. It follows the immediately succeeding digital signals passed to the multiplexer 4 would normally all be zero. This would represent a quantum signal level which would very probably be vastly different from neighbouring quantum signal levels and would produce an unpleasant and disconcerting click in the resulting speech. In order to prevent this, the MXSO pulse is prevented from putting off any of the triggers TM1 to TM5. This is arranged by means of the slow-to-operate element S1, the end and beginning elements E2 and B3 respectively and the gates G9 and I1. The slow-to-operate element S1 is arranged to produce a pulse beginning 23.5 microseconds after the start of the output of the end element E1 and having a duration of 23.5 microseconds. That is to say that this pulse, shown at FIGURE 4(*h*), is coincident with the last half of the waveform shown in FIGURE 4(*b*). When the trigger T6 is put on to open the gate G7, the end element E2 emits a two-microseconds pulse which in this case falls within the pulse (FIGURE 4(*h*)) at the output of the element S1. The gate G9 is, therefore, open to pass the output of the end element E2 to the beginning element B3 which immediately emits a 70 microseconds pulse (FIGURE 4(*i*)) to close the gate I1 and inhibit the MXSO pulse, thus preventing it from putting off any of the triggers TM1 to TM5. Therefore, in this case, one quantum of information transferred to the shift register SR through the gates GO1 to GO5 will be repeated, resulting in less distortion of the transmitted speech. It will be noted that in the case of the example given with reference to FIGURE 2, the trigger T6 would be put on before the element S1 gave an output pulse during the later half of the output from the end element E1 (FIGURE 2(*b*)) and, therefore, the gate G9 would be closed, the gate I1 would be open and the following MXSO pulse would not be inhibited.

FIGURE 5 also illustrates a case in which the multiplexer 4 is slightly faster than the signals derived from the demultiplexer 1. However, in the case of FIGURE 5 the trigger T6 is initially on and MX1 pulses are passing to the inhibiting inputs of the triggers T1 to T5. In FIGURE 5, the waveforms (*a*), (*b*), (*c*), (*d*) and (*e*) represents the MX1, MX2 and MXSO pulses, the state of the trigger T6 and the pulses applied to the inhibiting inputs of the triggers T1 to T5 respectively.

In the case illustrated by FIGURE 5, the first shown MX1 pulse (FIGURE 5(*a*)) is passed through the gate G7 to effect a normal transfer. The second shown MX1 pulse also passes through this gate to effect a transfer, but since it lies within an output pulse (FIGURE 4(*b*)) from the end element E1 it also passes through the gate G6 to change the state of the trigger T6. Subsequent pulses applied to the inhibiting inputs of the triggers T1 to T5 are, therefore, MX2 pulses which are allowed through the gate G8. However, the second shown MX1 pulse not only effects a transfer between the triggers T1 to T5 and the triggers TM1 to TM5 but also causes the triggers T1 to T5 to be put off. It follows that the following MX2 pulse applied to the inhibiting inputs of the triggers T1 to T5 would not effect a transfer since all of the triggers T1 to T5 are already off. This is not important, the triggers TM1 to TM5 having retained the previously transferred signals since there is no intervening MXSO pulse in this case.

In certain operational environments it may be desirable that the trigger T6 should not be allowed to change its state unless at least one digit 1 is transferred to the triggers T1 to T5. In that case, the circuit of FIGURE 1 may be modified so that the input of the beginning element B1 is derived from an OR gate (not shown) to which the outputs of all of the gates G1 to G5, reshaped if necessary, are fed.

Although the invention has been described with reference to four speech channels which are transmited between one terminal station and another in time-division multiplex, clearly any practicable number of such channels may be employed. Furthermore, although the incoming signals to the demultiplexer 1 (FIGURE 1) and the outgoing signals from the multiplexer 4 are described as containing a synchronising signal for each group of five P.C.M. digit signals on each channel, a synchronising signal need not be inserted with each group of digits as long as it is inserted into the signal train at regular intervals. In this case, the pulses, such as those shown at FIGURES 2(*a*) and 4(*a*), may be generated from the synchronising signals at the demodulator 1 (FIGURE 1). Alternatively, the channels coming in to the demultiplexer 1 (FIGURE 1) may be carried on two lines instead of one. In that case, one line would carry the pulse code modulation signals relating to the incoming channels and the other line would carry synchronising signals. The demultiplexer 1 would then provide two outputs for each channel, one providing the pulse code modulation signals for that channel and the other providing five synchronising signals for that channel. The delay line D1 could then be replaced by a shift register to the first stage of which the serially occurring pulse code modulation signals would be applied. The synchronising signals would then be applied to the shift register to shift its content by one stage at times intermediately between the times of occurrence of the pulse code modulation signals. A delayed version of the fifth synchronising signal could then be used to transfer the content of the shift register to the triggers T1 to T5 and to clear the shift register.

Further, the sytem described above is also suitable for use with delta modulation signals although some simplification of the circuit is possible. In the case of delta modulation, only one digit signal has to be transferred at a time so that the delay line D1 and the shift register SR may be eliminated from the circuit together with the detector 3 and the triggers T2 to T5 and TM2 to TM5 and their associated circuits. Also, since the loss of a single delta modulation signal causes no great upset in the overall speech signal, the slow-to-operate element S1, the end element E2, the gates G9 and I1 and the beginning element B3 are, in this case, not necessary in the system.

I claim:

1. A digital speech transfer system including receiving means, transmitting means operating at the same nominal digit frequency as the receiving means, a store, means for interrogating the store connected between said receiving and transmitting means by interrogation signals related in time to the digit of the transmitting means and control means for controlling variably the relative timing of the interrogation signals and the times of receipt of incoming digital signals into the store so that the interrogation signals do not occur during the times of receipt of the incoming digital signals into the store.

2. A digital speech transfer system as claimed in claim 1 and wherein the control means includes means for generating a guard signal embracing in time the time of receipt of at least one incoming digital signal into the store and means for adjusting the relative timing of the interrogation signals and the times of receipt of incoming digital signals into the store whenever an interrogation signal occurs during a guard signal.

3. A digital speech transfer system for transferring digital speech signals from a receiver to a transmitter operatng at approximately the same digit repetition frequency as the receiver including a receiver store arranged to be set up at regular intervals in accordance with at least one received digit signal, a transmitter store, means for generating from a received signal a guard pulse which embraces the time at which the receiver store is set up, means for generating a first train of transfer pulses which recur at regular intervals having approximately the same duration as the intervals between the settings up of the receiver store, means for generating a second train of transfer pulses occurring intermediately between the pulses of the first train of transfer pulses and switching means arranged to select one or the other of the trains of transfer pulses to effect transfer of digit signals from the receiver store to the transmitter store such that an alternative one of the trains of transfer pulses is so selected when a pulse of the other train lies within the guard pulse.

4. A digital speech transfer system as claimed in claim 3 and wherein the switching means includes a trigger, a first coincidence gate connected to the output of the trigger and to which the first train of transfer pulses is applied, a second coincidence gate connected to the negated output of the trigger and to which the second train of transfer pulses is applied and a third coincidence gate connected to the combined outputs of the first gate and the second gate and to which the guard pulse is applied, the output of the third gate being connected to a changeover input of the trigger.

5. A digital speech transfer system as claimed in claim 4 and wherein there is provided means for applying to the transmitter store a third train of pulses which recur after pulses in the second train of pulses and before immediately succeeding pulses in the first train of pulses and means for applying the third train of pulses to the transmitter store to clear the transmitter store.

6. A digital speech transfer system as claimed in claim 5 and wherein there is provided means for generating a first pulse coincident with a last portion of the guard pulse, means for generating a second pulse when, and only when, the trigger is put off and means for inhibiting pulses in the third train of pulses when, and only when, the first pulse and the second pulse are coincident.

7. A digital speech transfer system as claimed in claim 6 and wherein the receiver store includes a first plurality of triggers to which the selected train of the first train of transfer pulses and the second train of transfer pulses is applied to clear the triggers and effect transfer to the transmitter store.

8. A digital speech transfer system as claimed in claim 7 and wherein the transmitter store is a second plurality of triggers each connected to a corresponding one of the first plurality of triggers through an end element.

9. A digital speech transfer system as claimed in claim 7 and wherein the means for generating a guard pulse includes a synchronising pulse detector.

10. A digital speech transfer system including receiving means, transmitting means operating at the same nominal digit repetition frequency as the receiving means, a store connected to the receiving means, transfer means connected between the store and the transmitting means, means for generating interrogation signals which are related in time to the digit timing of the transmitting means and are applied to the transfer means to effect the transfer of digital signals from the store to the transmitting means, and including control means, connected to the receiving means, the transfer means and the said means for generating interrogation signals for controlling variably the relative times of receipt of received digital signals into the store and the times of application of interrogation signals to the transfer means so that the interrogating signals are not applied to the transfer means during the times of receipt of incoming digital signals into the store.

11. A digital speech transfer system for transferring digital speech signals from a receiver to a transmitter operating at approximately the same digit repetition frequency as the receiver and including receiver storage means connected to the receiver and having a single storage location arranged to be set up at regular intervals in accordance with at least one received digit signal; a transmitter store connected to the transmitter; transfer means for effecting, when operated, transfer of digital information from the receiver storage means to the transmitter store, and connected between the receiver store and the transmitter store; guard pulse generating means, connected to the receiver, for generating from a received signal a guard pulse which embraces the time at which the receiver store is set up; the transmitter including transfer pulse generating means for generating a first train of transfer pulses which recur at regular intervals having approximately the same duration as the intervals between settings up of the receiver store and for generating a second train of transfer pulses occurring intermediately between the pulses of the first train of transfer pulses; and switching means connected to the transfer means, to the guard pulse generating means and to the transfer pulse generating means for selecting one or the other of the trains of transfer pulses for application to the said transfer means to operate the transfer means, such that, when a pulse of one train of transfer pulses occurs within the duration of a guard pulse, the other train of transfer pulses is so selected to operate the transfer means.

12. A digital speech transfer system as claimed in claim 11 and wherein the switching means includes a trigger, a first coincidence gate connected to the output of the trigger and to which the first train of transfer pulses is applied, a second coincidence gate connected to the negated output of the trigger and to which the second train of transfer pulses is applied and a third coincidence gate connected to the combined outputs of the first gate and the second gate and to which the guard pulse is applied, the output of the third gate being connected to a change-over input of the trigger.

13. A digital speech transfer system as claimed in claim 12 and wherein there is provided means for applying to the transmitter store a third train of pulses which recur after pulses in the second train of pulses and before immediately succeeding pulses in the first train of pulses and means for applying the third train of pulses to the transmitter store to clear the transmitter store.

14. A digital speech transfer system as claimed in claim 13 and wherein there is provided means for generating a first pulse coincident with a last portion of the guard pulse, means for generating a second pulse when, and only when, the trigger is put off and means for inhibiting pulses in the third train of pulses when, and only when, the first pulse and the second pulse are coincident.

15. A digital speech transfer system as claimed in claim 14 and wherein the receiver storage means includes a first plurality of triggers and wherein the selected train of transfer pulses is applied to clear the triggers and thereby to effect transfer of digital signals contained therein to the transmitter store.

16. A digital speech transfer system as claimed in claim 15 and wherein the transmiter store is a second plurality of triggers each connected to a corresponding one of the first plurality of triggers through an end element.

17. A digital speech transfer system as claimed in claim 15 and wherein the said guard pulse generating means includes a synchronizing pulse detector.

References Cited by the Examiner

UNITED STATES PATENTS

| | | | |
|---|---|---|---|
| 2,706,215 | 4/1955 | Van Duuren | 178—23 |
| 2,985,865 | 5/1961 | Merz | 340—172 |

DAVID G. REDINBAUGH, *Primary Examiner.*

R. L. GRIFFIN, *Assistant Examiner.*